US011752705B2

(12) United States Patent
Blonigen et al.

(10) Patent No.: US 11,752,705 B2
(45) Date of Patent: *Sep. 12, 2023

(54) METHODS OF FABRICATING MULTI-REGION U-SHAPED COMPOSITE STRUCTURES

(71) Applicant: Spirit AeroSystems, Inc., Wichita, KS (US)

(72) Inventors: Bradley J. Blonigen, Wichita, KS (US); George M. Osborne, Wichita, KS (US); Jack Hearnen, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,895

(22) Filed: Dec. 20, 2022

(65) Prior Publication Data

US 2023/0127118 A1 Apr. 27, 2023

Related U.S. Application Data

(63) Continuation of application No. 17/328,426, filed on May 24, 2021, now Pat. No. 11,571,863.

(51) Int. Cl.
| | | |
|---|---|---|
| *B29C 70/00* | (2006.01) | |
| *B29C 70/22* | (2006.01) | |
| *B29C 70/38* | (2006.01) | |
| *B29K 307/04* | (2006.01) | |
| *B29K 309/08* | (2006.01) | |

(52) U.S. Cl.
CPC .......... *B29C 70/222* (2013.01); *B29C 70/382* (2013.01); *B29K 2307/04* (2013.01); *B29K 2309/08* (2013.01)

(58) Field of Classification Search
CPC .................................................. B29C 70/222
See application file for complete search history.

(56) References Cited

U.S. PATENT DOCUMENTS

| | | | |
|---|---|---|---|
| 11,571,863 B2 * | 2/2023 | Blonigen | B29C 70/222 |
| 2019/0084214 A1 | 3/2019 | Drexler et al. | |
| 2019/0184650 A1 | 6/2019 | Ingram et al. | |
| 2020/0130291 A1 | 4/2020 | Heath, III et al. | |

FOREIGN PATENT DOCUMENTS

| | | |
|---|---|---|
| JP | 2020032463 | 3/2020 |
| WO | 2020023624 | 1/2020 |

OTHER PUBLICATIONS

International Search Report and Written Opinion in related PCT Application PCT/US2022/023396 dated Jul. 25, 2022, 10 pages.

* cited by examiner

*Primary Examiner* — Jeffry H Aftergut
(74) *Attorney, Agent, or Firm* — Hovey Williams LLP

(57) ABSTRACT

Methods of fabricating a multi-region U-shaped composite structure, the methods comprising the steps of laying up a first composite material on a first tool piece to form a first sidewall, laying up the second composite material on a second tool piece tool to form a second sidewall, re-orienting the first tool piece and the second tool piece to a consolidation orientation, laying up the third composite material to form a nose wall, and overlapping at least a portion of the third composite material with at least a portion of the first composite material and at least a portion of the second composite material.

20 Claims, 12 Drawing Sheets

METHODS OF FABRICATING MULTI-REGION U-SHAPED COMPOSITE STRUCTURES

RELATED APPLICATIONS

The present U.S. non-provisional patent application is a continuation and claims priority benefit of an earlier filed U.S. non-provisional patent application with the same title, Ser. No. 17/328,426, filed May 24, 2021. The entire content of the identified earlier-filed application is incorporated by reference as though fully set forth herein.

BACKGROUND

Composite U-shaped structures with high depth-to-opening aspect ratios preclude several layup options such as laser projection due to limited fabrication accessibility. Bridging in nose areas is also common due to the long fiber draw distances during debulking and due to the practice of clamping sidewalls of the structures. Furthermore, such composite U-shaped structures employ homogenous architecture, which necessitates compromises in the nose areas or the sidewalls.

SUMMARY

Embodiments of the present invention solve the above-mentioned problems and other problems and provide a distinct advance in the art of fabricating composite U-shaped composite structures. More particularly, embodiments of the invention provide methods of fabricating multi-region U-shaped composite structures that afford improved accessibility during sidewall layup and permit more complex structure architecture.

An embodiment of the invention is a method of fabricating a multi-region U-shaped composite structure via a female two-piece tool. First, a first surface film (lightning protection, wear protection, or the like) is deposited on a first layup surface of a first tool piece and a second layup surface of a second tool piece with the first tool piece and the second tool piece being separated and in a sidewall layup orientation. A second surface film is then deposited on the first surface film. A sidewall base carbon fiber layer is then laid up on the second surface film on the first tool piece and the second tool piece.

First and second composite materials are then laid up in layers on the sidewall base carbon fiber layers to form a first sidewall and a second sidewall. The first composite material and second composite material are laid up so that each layer exposes a portion of the layer below it to form a tapered end. The composite material layup may be performed via automated fiber placement, hand layup assisted with laser projection, ply template hand layup, or any other suitable automated or assisted layup. The composite material layup may incorporate prepreg material or dry fiber in preparation for resin infusion. An ultrasonic knife may be used to reduce AFP tolerance stack-up and effect between 25% to 50% scarf joint size reduction.

The first tool piece and second tool piece are then reoriented from the sidewall layup orientation to a consolidation orientation (i.e., a U-shape orientation). The first tool piece and second tool piece are then attached to each other. The first layup surface and the second layup surface form a single essentially seamless surface with a space between the first sidewall and the second sidewall. Importantly, an aspect ratio of the depth of the first sidewall and/or second sidewall to the width of the space therebetween may be approximately or at least 1, 1.5, 2, or higher, such that it would be difficult to create the first sidewall and second sidewall via the above techniques without the tool pieces first being separated.

A third surface film is then deposited on the nose portion of the second layup surface. A fourth surface film is then deposited on the third surface film. A base fiberglass fabric layer is then laid up on the fourth surface film.

A nose filler is then laid in the middle of the nose layup region of the second layup surface. The nose filler may be a radius filler adhesive with or without fibers or similar malleable material or component. A nose base carbon fiber layer is then laid up over the nose filler and the base fiberglass fabric layer.

A third composite material is then laid up in layers on the nose base carbon fiber layer to form the nose wall. The third composite material is laid up so that each layer overlaps an exposed layer of the first composite material and second composite material, thereby forming slip planes (and hence scarf joints) between the nose wall and the first sidewall and between the nose wall and the second sidewall. The composite material layup forming the nose wall may be performed by hand, ply by ply, or by a suitable technique. The composite material layup may incorporate dry fiber or prepreg material. The third composite material may be woven preform or woven plies for improved impact resistance.

Sidewall cap carbon fiber layers are then laid up over the first composite material and second composite material. A nose wall cap carbon fiber layer is then laid up over the third composite material. Sidewall cap fiberglass fabric layers are then laid up over the sidewall cap carbon fiber layers. A nose wall cap fiberglass fabric layer is then laid up over the nose wall cap carbon fiber layer.

The nose wall and/or first and second sidewalls are then debulked, which may be performed via a debulking tool. The debulking tool may incorporate a vacuum system, which may be integrated into the two-piece tool.

The first sidewall, second sidewall, and nose wall may then be co-cured. To that end, the first composite material, second composite material, and third composite material may be co-cure compatible.

The first tool piece and second tool piece are then separated from each other. The multi-region U-shaped structure is then removed from one of the tool pieces. It may also be possible to remove the multi-region U-shaped structure without separating the tool pieces.

Another embodiment is a method of fabricating a multi-region U-shaped composite structure via a female three-piece tool. First, a first surface film (lightning protection, wear protection, or the like) is deposited on a first layup surface of a first tool piece and a second layup surface of a second tool piece with the first tool piece and the second tool piece separated and in a sidewall layup orientation. A second surface film is then deposited on the first surface film. A sidewall base carbon fiber layer is then laid up on the second surface film.

A first composite material and second composite material is then laid up in layers on the sidewall base carbon fiber layers to form a first sidewall and a second sidewall. The first composite material and second composite material may be laid up so that each layer exposes a portion of the layer below it to form a tapered end. The composite material layup may be performed via automated fiber placement, laser projection, ply template layup, or any other suitable automated or assisted layup. The composite material layup may incorporate resin infusion or prepreg material. An ultrasonic knife may be used to reduce AFP tolerance stack-up and effect between 25% to 50% scarf joint size reduction.

A third surface film is then deposited on a third layup surface of a third tool piece, a first auxiliary layup surface of a first auxiliary component attached to the third tool piece, and a second auxiliary layup surface of a second auxiliary component attached to the third tool piece opposite the first auxiliary component. A fourth surface film is then deposited on the third surface film.

A base fiberglass fabric layer is then laid up on the fourth surface film. A nose filler is then laid up in the middle of the third layup surface. The nose filler may be a radius filler adhesive with or without fibers or similar malleable material or component. A nose base carbon fiber layer is then laid up over the nose filler and the base fiberglass fabric layer.

A third composite material is then laid up in layers on the nose base carbon fiber layer to form a nose wall. The composite material layup forming the nose wall may be performed by hand ply by ply, preformed in a separate offline process, or by any other suitable technique. The third composite material may be woven preform or woven plies for improved impact resistance. The composite material layup may incorporate resin infusion or prepreg material.

The first tool piece and second tool piece are then reoriented from the sidewall layup orientation to a consolidation orientation. The first auxiliary component and second auxiliary component are also removed from the third tool piece. The first tool piece and second tool piece are then attached to the third tool piece. The first layup surface, the second layup surface, and the third layup surface should form a single essentially seamless surface.

Layers of the third composite material should overlap the layers of the first composite material and the second composite material thereby forming slip planes (and hence scarf joints) between the nose wall and the first sidewall and between the nose wall and the second sidewall. Importantly, an aspect ratio of the depth of the first sidewall and/or second sidewall to the width of the space therebetween may be approximately or at least 1, 1.5, 2, or higher, such that it would be difficult to create the first sidewall and second sidewall via the above techniques without the first and second tool pieces first being separated.

Sidewall cap carbon fiber layers are then laid up over the first composite material and second composite material of the first sidewall and second sidewall. A nose wall cap carbon fiber layer is then laid up over the third composite material of the nose wall. Sidewall cap fiberglass fabric layers are then laid up over the sidewall cap carbon fiber layers. A nose wall cap fiberglass fabric layer is then laid up over the nose wall cap carbon fiber layer.

The nose wall is then debulked, which may be performed via a debulking tool. The debulking tool may incorporate a vacuum system, which may be integrated into the three-piece tool.

The first sidewall, second sidewall, and nose wall may then be co-cured. To that end, the first composite material, second composite material, and third composite material may be co-cure compatible.

The first tool piece, second tool piece, and third tool piece are then separated from each other. The multi-region U-shaped structure is then removed from the third tool piece. It may also be possible to remove the multi-region U-shaped structure without separating the tool pieces.

The above methods are described in terms of outer mold line (OML) layup utilizing female tooling. Structural plies can also be laid up via inner mold line (IML) layup mandrel utilizing male tooling and the plies can be transferred from the layup mandrel to the female, cure tool. Other features such as the nose filler and lightning strike material (e.g., Expanded Copper Foil (ECF) material) may subsequently be applied in a cure tool.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
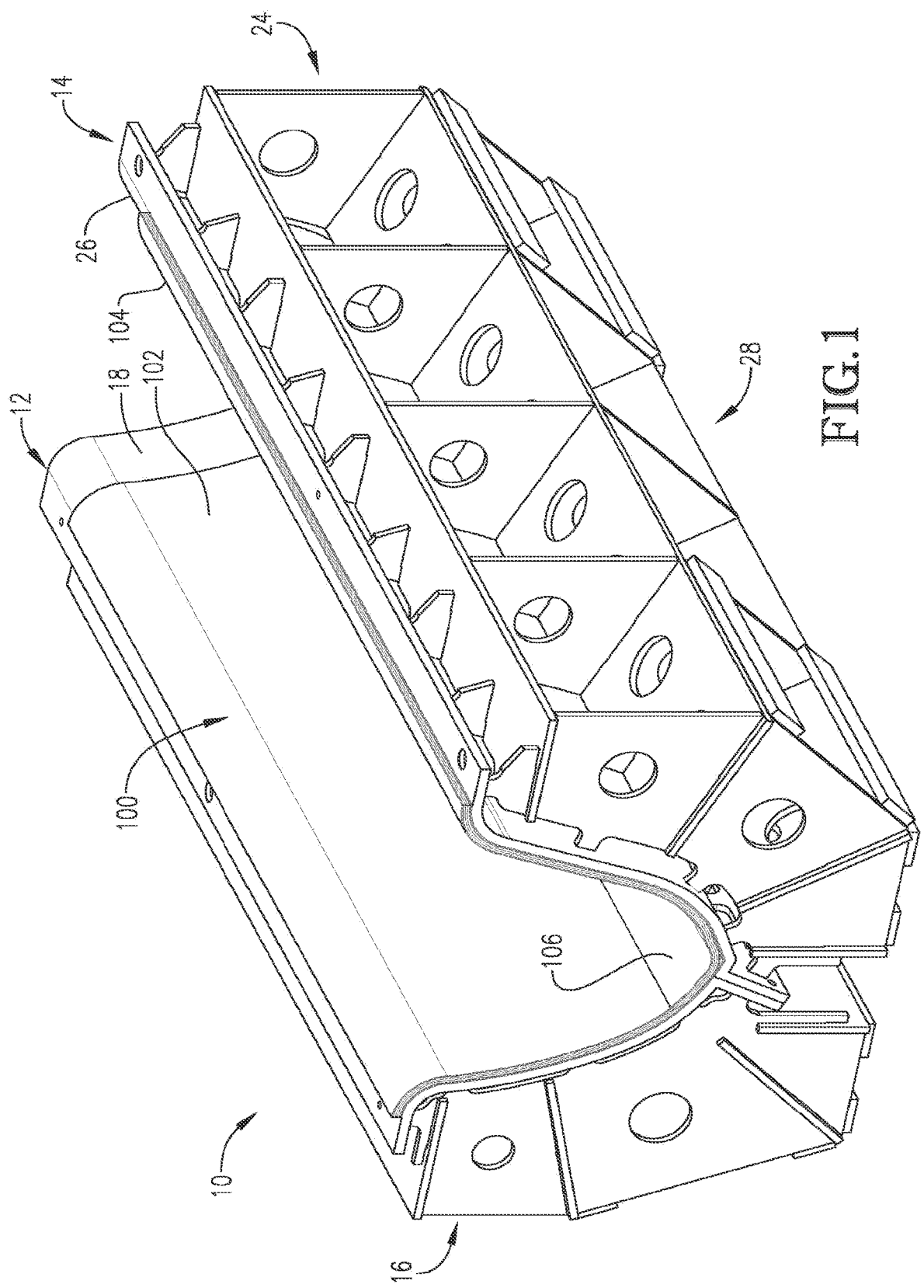
FIG. 1 is a perspective view of a two-piece tool assembled in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Embodiments of the present invention are directed to methods of fabricating multi-region U-shaped composite structures via two-piece and three-piece tools. The multi-region U-shaped composite structures may be leading edges, trailing edges, rotor blades, horizontal stabilizers, vertical stabilizers, nacelle inlets, and other aircraft components.

Figure 2:
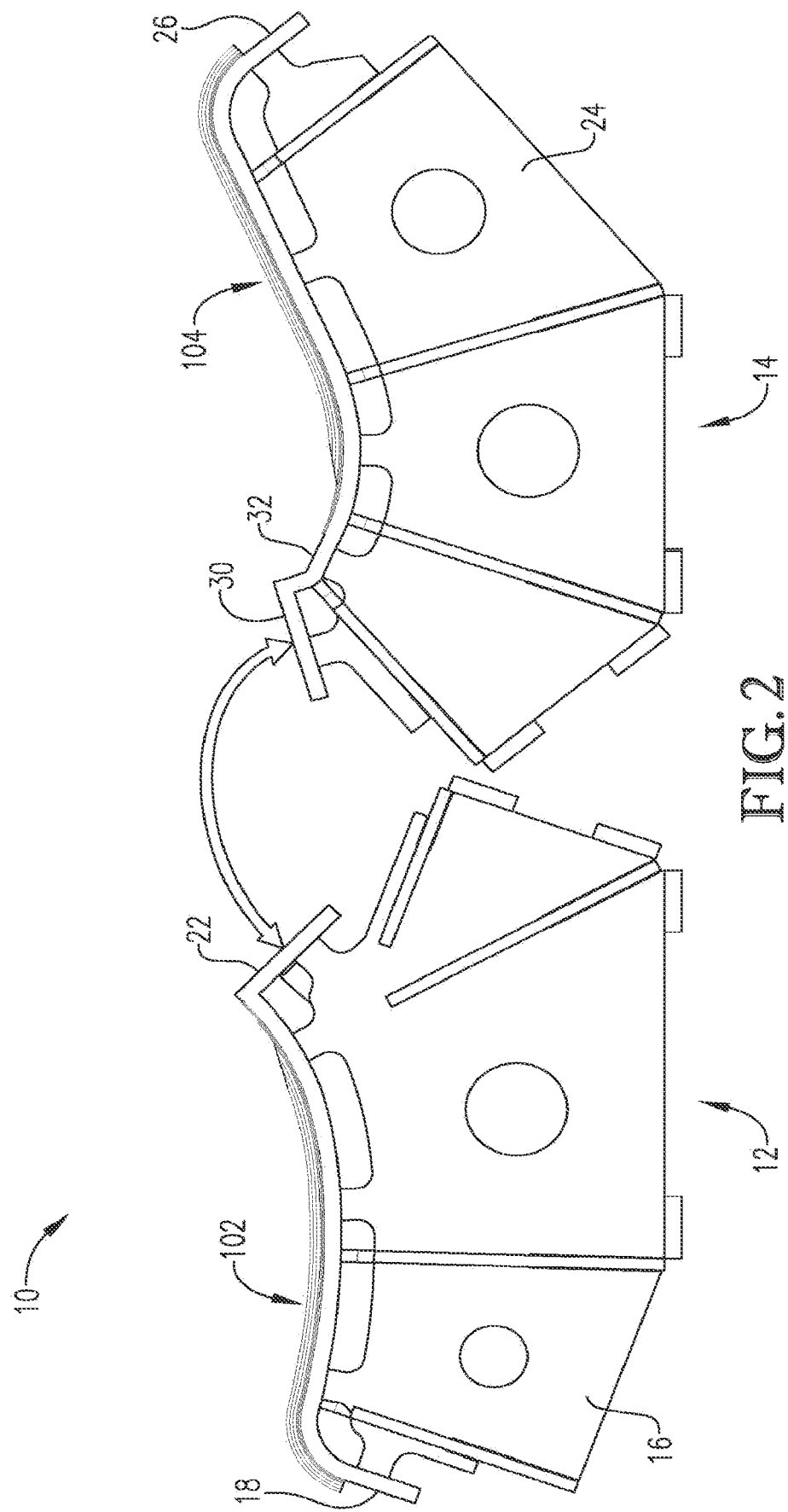
FIG. 2 is an elevation view of the two-piece tool of FIG. 1 in a pre-assembled stage.
Figure 3:
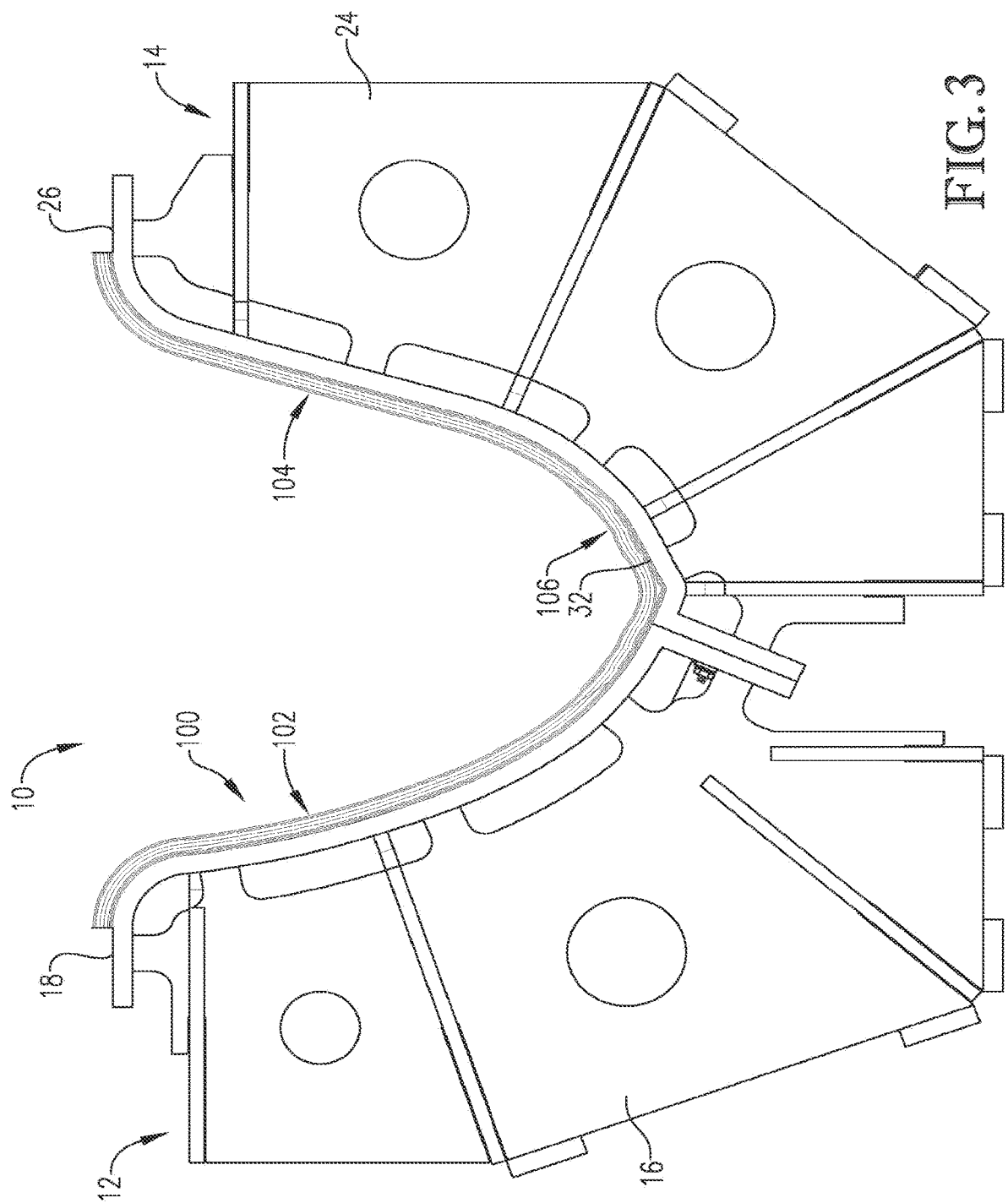
FIG. 3 is an elevation view of the two-piece tool of FIG. 1 in an assembled stage.
Figure 4:
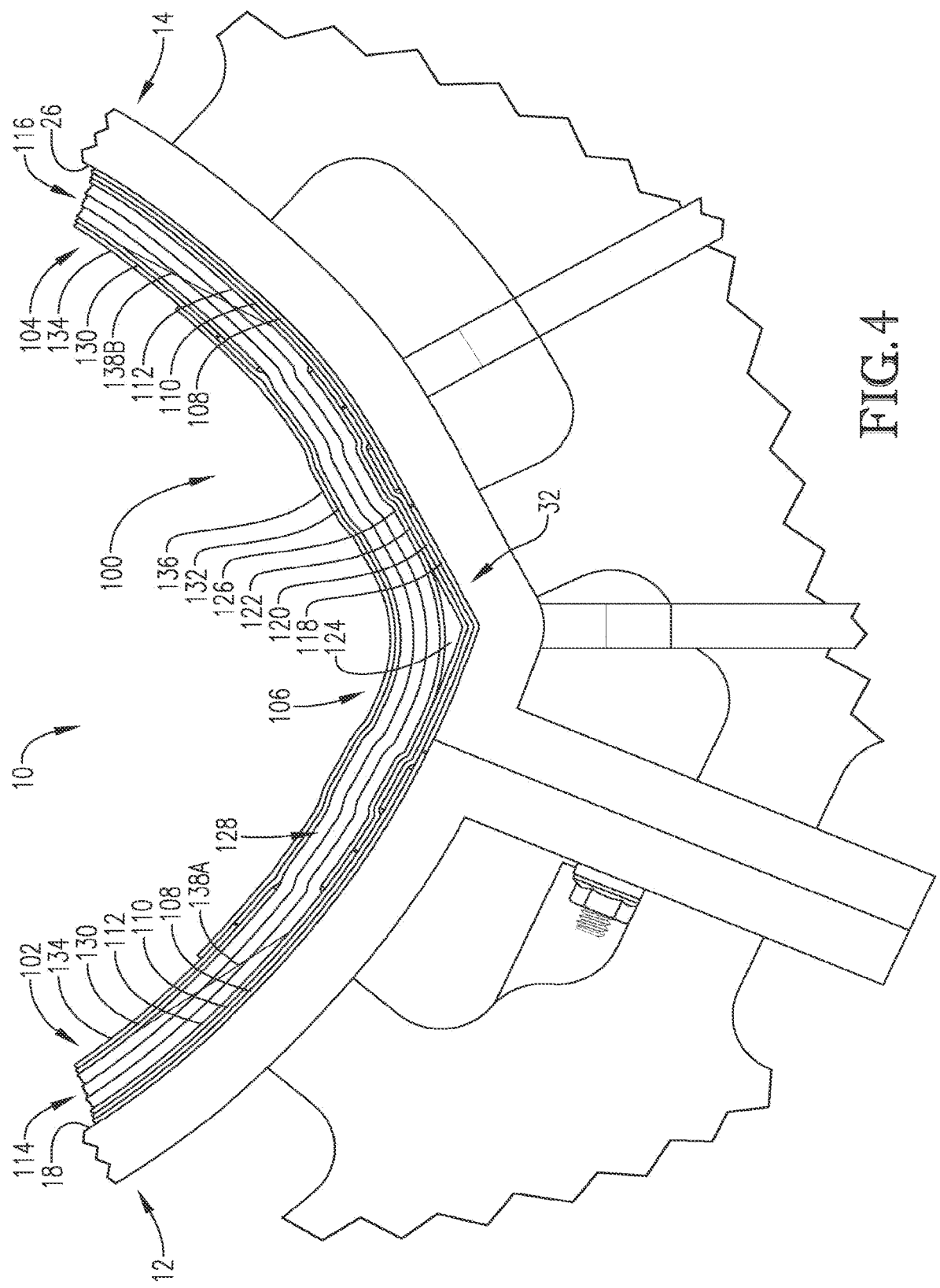
FIG. 4 is a close-up elevation view of the two-piece tool of FIG. 1.

Turning to FIGS. 1-3, a two-piece tool 10 for use in one embodiment is illustrated. The two-piece tool 10 broadly comprises a first tool piece 12 and a second tool piece 14.

The first tool piece 12 may include a support structure 16 and a first layup surface 18. The first tool piece 12 may be configured to be moved from a sidewall layup orientation to a consolidation orientation. The first tool piece 12 may also be configured to be connected to the second tool piece 14 in the consolidation orientation.

The support structure 16 may include forklift tine geometry, hoist ring geometry, or other features for moving and handling the first tool piece 12. The support structure 16 may include ribs, frame plates, and other components for providing rigidity. The support structure 16 may also include connection geometry 22 such as bolt holes, interlocking tabs, clamps, or the like for connecting the first tool piece 12 to the second tool piece 14. The connection geometry 22 may include a sealing area for forming a vacuum-tight connection between the first tool piece 12 and second tool piece 14 for bagging, consolidation, and curing.

The first layup surface 18 may be a gradually-sloped smooth surface for laying up materials to form a first sidewall 102. The first layup surface 18 may include a plurality of concave or convex curves. The first layup surface 18 may also curve in multiple dimensions to form a complex shape. The first layup surface 18 may have a depth (in consolidation orientation) smaller or larger than a depth of the second layup surface.

The second tool piece 14 may include a support structure 24 and a second layup surface 26. The second tool piece 14 may be configured to be moved from a sidewall layup orientation to a consolidation orientation. The second tool piece 14 may also be configured to be connected to the first tool piece 12 in the consolidation orientation.

The support structure 24 may include forklift tine geometry 28, hoist ring geometry, or other features for moving and handling the second tool piece 14. The support structure 24 may include ribs, frame plates, and other components for providing rigidity. The support structure 24 may also include connection geometry 30 such as bolt holes, interlocking tabs, clamps, or the like for connecting the second tool piece 14 to the first tool piece 12. The connection geometry 30 may include a sealing area for forming a vacuum-tight connection between the first tool piece 12 and second tool piece 14 for bagging, consolidation, and curing.

The second layup surface 26 may be a gradually-sloped smooth surface for laying up materials to form a second sidewall 104 and a nose wall 106. The second layup surface 26 may include a plurality of concave or convex curves. The second layup surface 26 may also curve in multiple dimensions to form a complex shape. The second layup surface 26 may have a depth (in consolidation orientation) smaller or larger than a depth of the first layup surface. The second layup surface 26 may specifically include a nose layup region 32 for laying up materials to form the nose wall 106. The nose layup region 32 may have increased curvature (smaller radii) compared to other portions of the second layup surface 26 and compared to the first layup surface 18. The nose layup region 32 may also curve in multiple dimensions to form a complex shape. In one embodiment, the nose layup region 32 forms an edge (seen as a point in elevation view). The second layup surface 26 may terminate in the nose layup region such that the second layup surface 26 and the first layup surface 18 form a continuous curve when the first tool piece 12 and the second tool piece 14 are positioned adjacent each other and connected.

Figure 5:
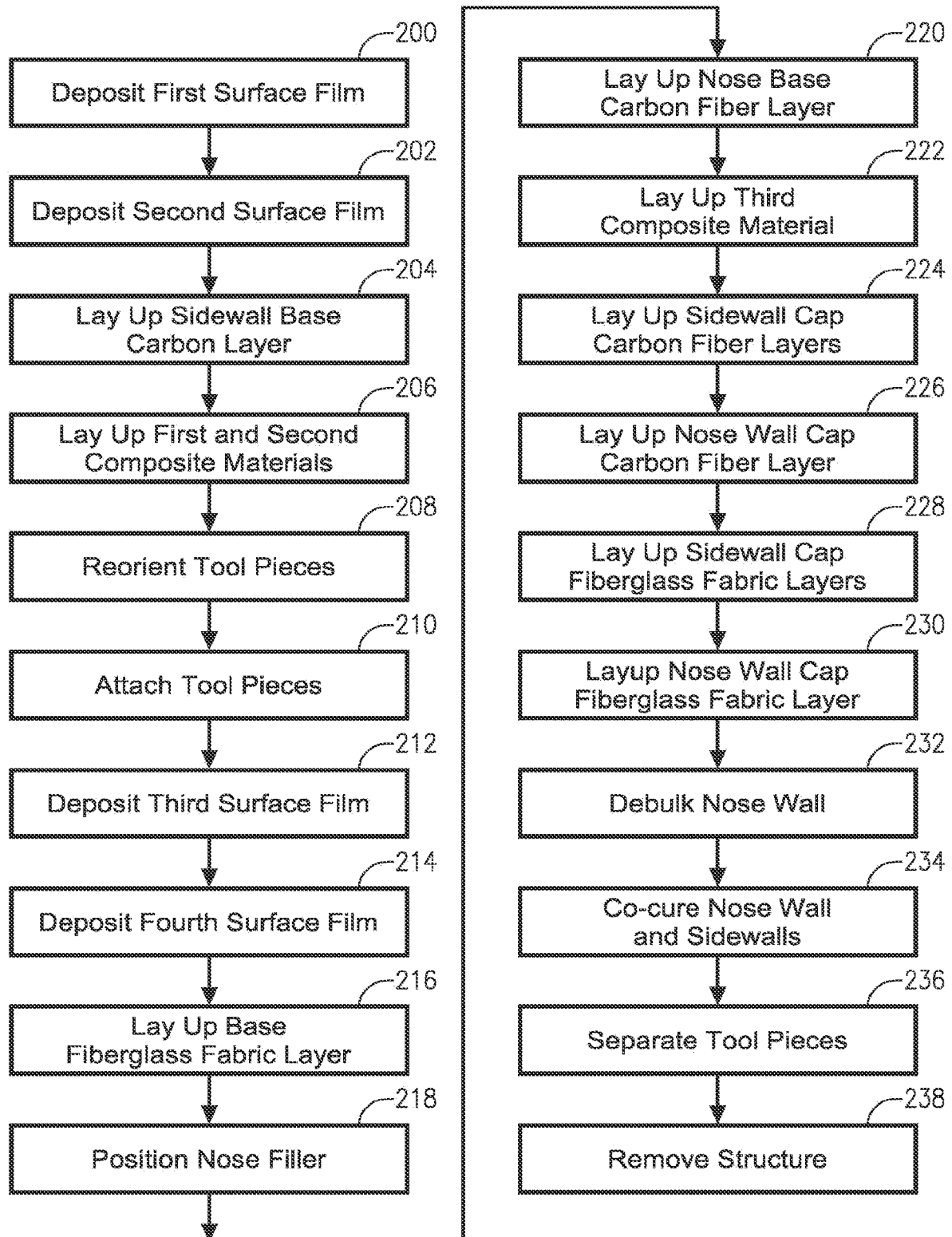
FIG. 5 is a flow diagram depicting certain steps of a method of fabricating a multi-region U-shaped composite structure via the two-piece tool of FIG. 1.
Figure 6:
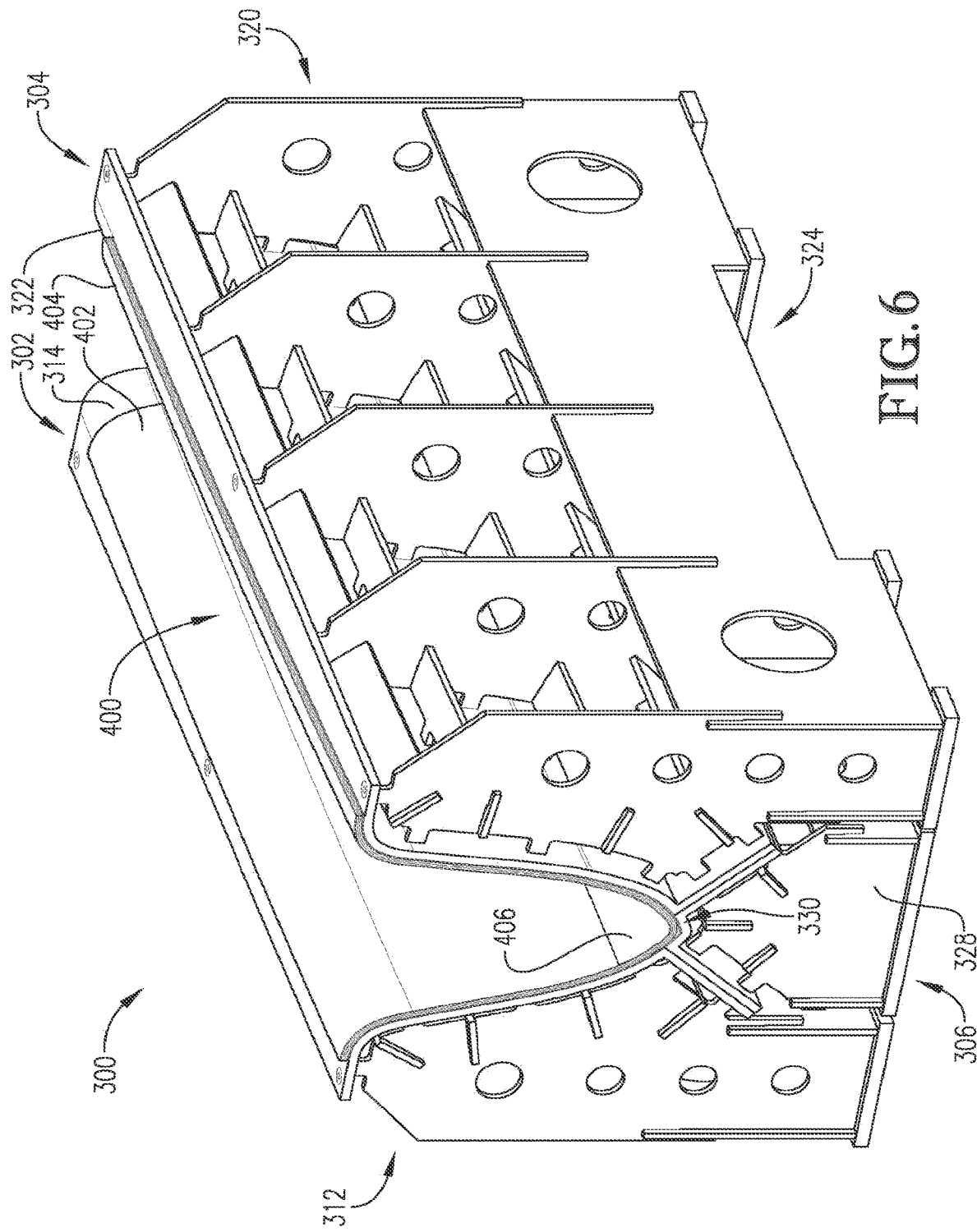
FIG. 6 is a perspective view of a three-piece tool assembled in accordance with another embodiment of the invention.
Figure 7A:
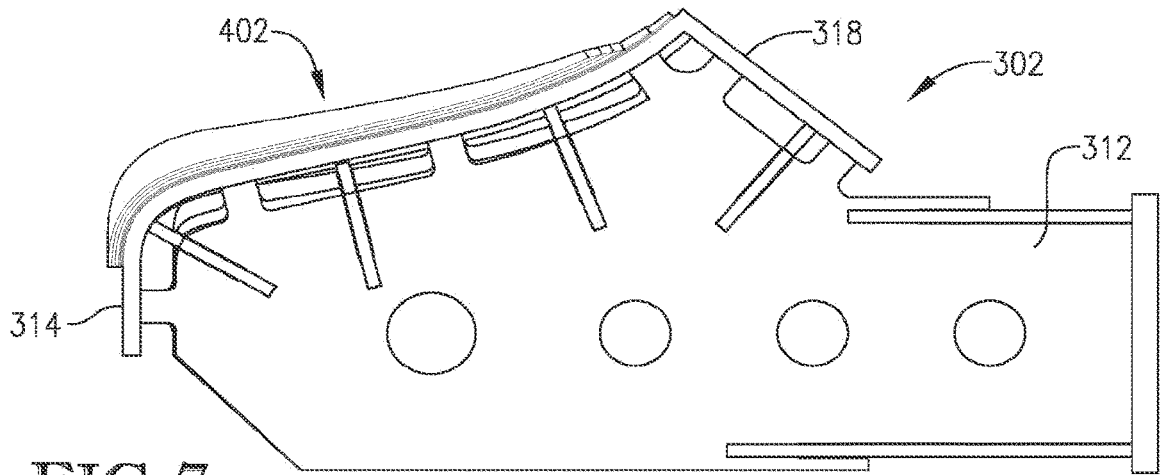
FIG. 7a is an elevation view of a first piece of the three-piece tool of FIG. 6 in a pre-assembled stage.
Figure 7B:
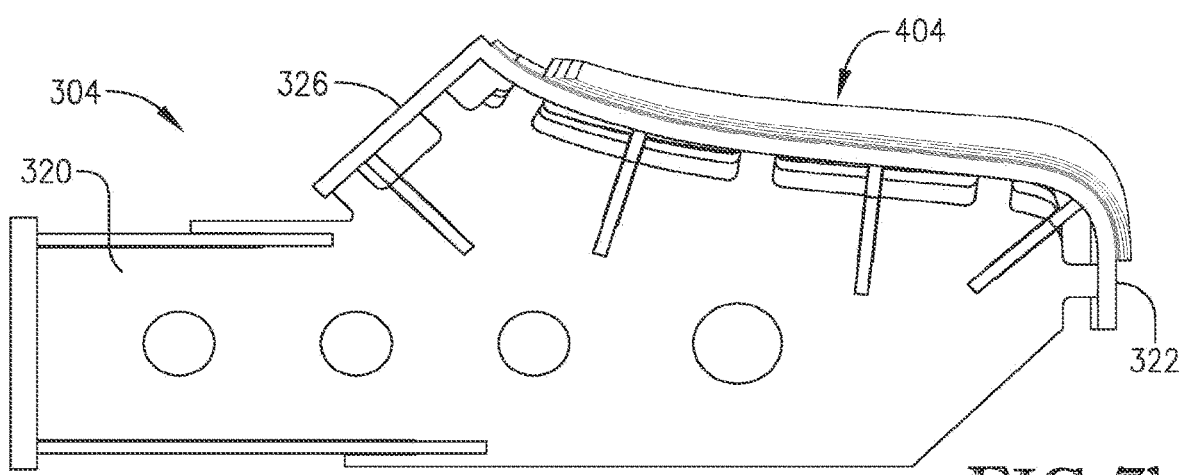
FIG. 7b is an elevation view of a second piece of the three-piece tool of FIG. 6 in a pre-assembled stage.
Figure 7C:
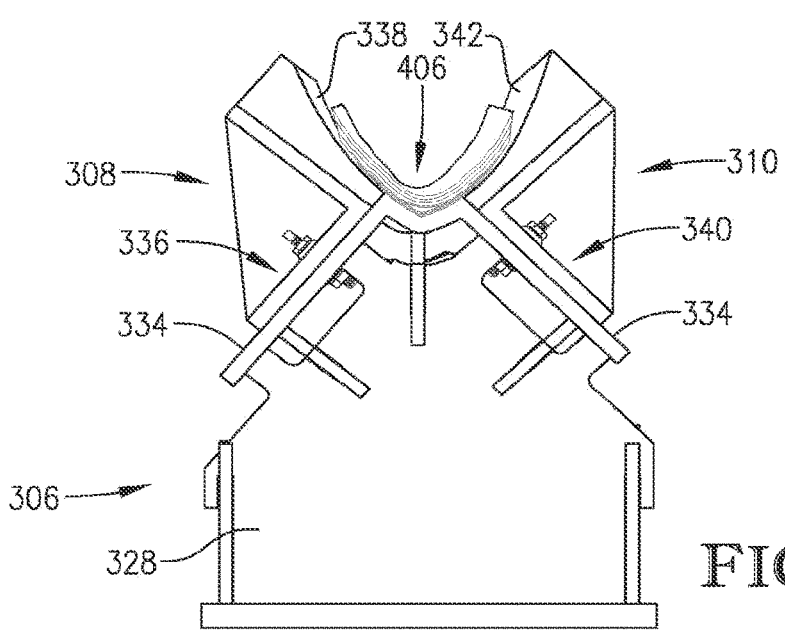
FIG. 7c is an elevation view of a third piece of the three-piece tool of FIG. 6 in a pre-assembled stage.
Figure 8:
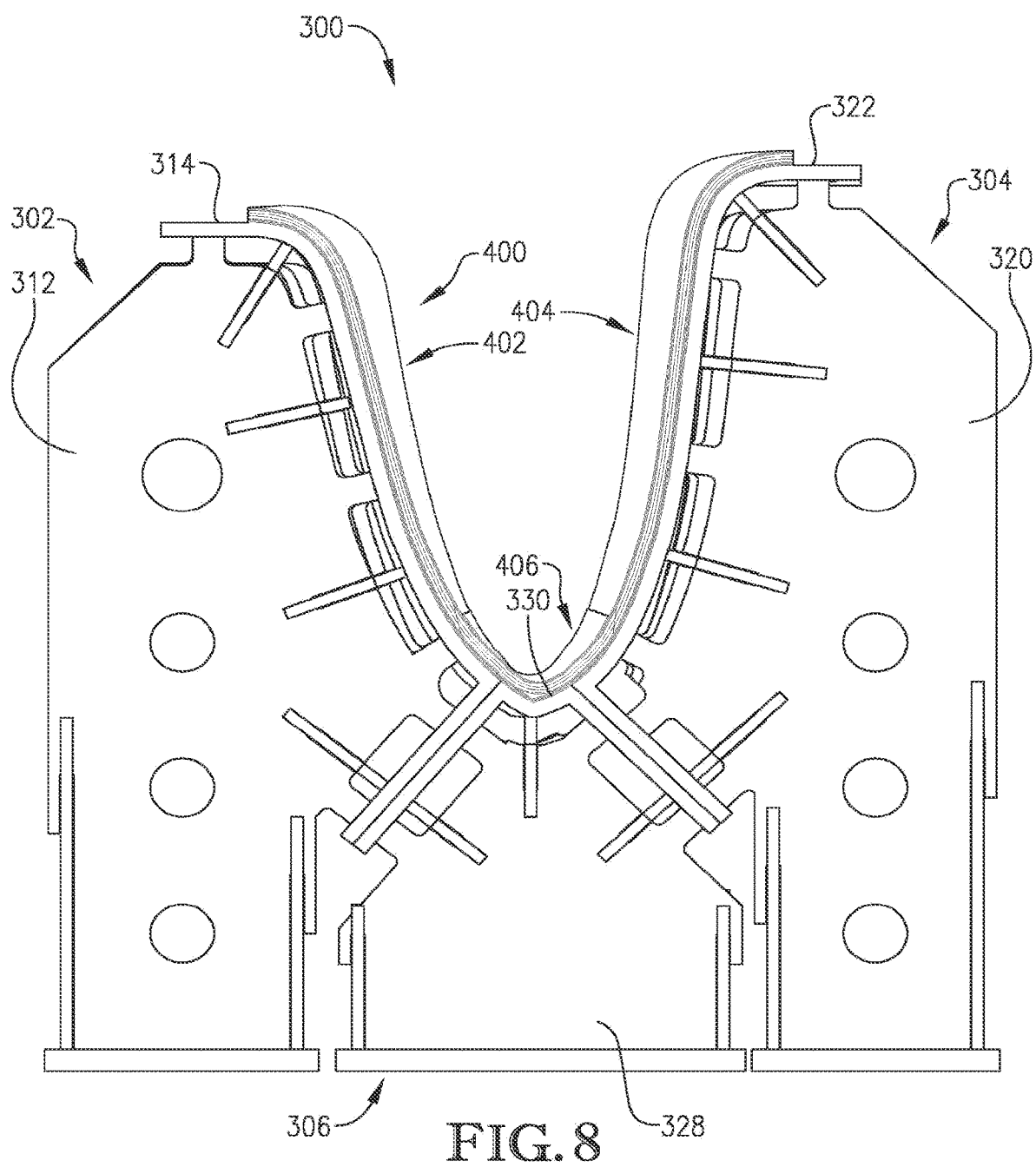
FIG. 8 is an elevation view of the three-piece tool of FIG. 6 in an assembled stage.
Figure 9:
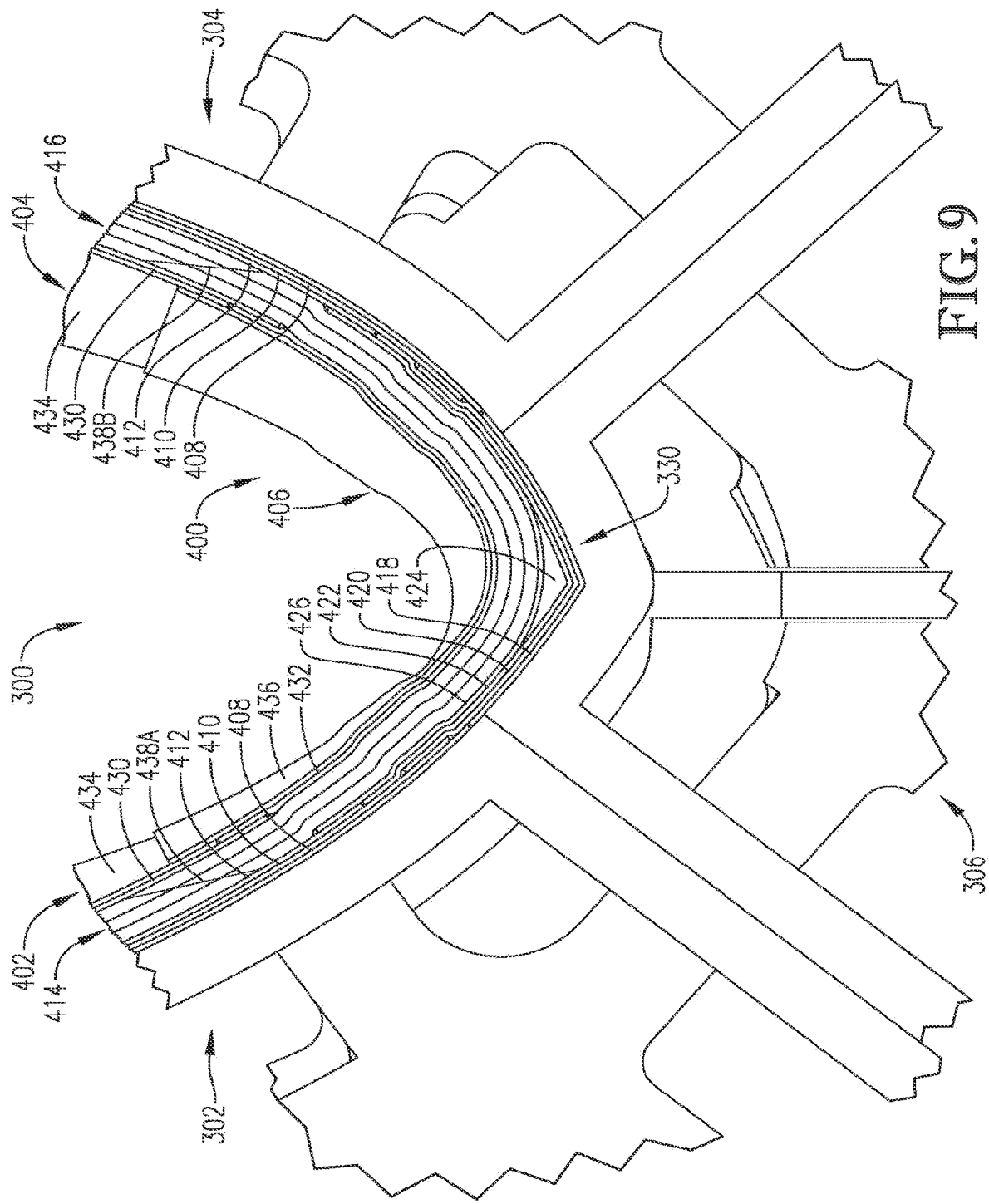
FIG. 9 is a close-up elevation view of the three-piece tool of FIG. 6.

Turning to FIG. 5, and with reference to FIGS. 1-4, a method of fabricating a multi-region U-shaped composite structure 100 via a two-piece tool will now be described in detail. The method will be described with reference to two-piece tool 10, but other two-piece tools may be used.

First, a first surface film 108 (including embedded lightning protection such as expanded copper foil (ECF), wear protection, or the like) may be deposited on the first layup surface 18 and the second layup surface 26 with the first tool piece 12 and the second tool piece 14 separated and in a sidewall layup orientation, as shown in block 200. The first surface film 108 may be SM905, SM905ECF, or similar material. A second surface film 110 (additional lightning protection, wear protection, or an adhesive) may then be deposited on the first surface film 108, as shown in block 202. The second surface film 110 may be SM905, SM905ECF, or similar material. A sidewall base carbon fiber layer 112 (e.g., carbon PW) may then be laid up on the second surface film 110, with some of the second surface film 110 being exposed, as shown in block 204.

First composite material 114 and second composite material 116 may then be laid up in layers on the sidewall base carbon fiber layer 112 to form the first sidewall 102 and the second sidewall 104, as shown in block 206. The first composite material 114 and second composite material 116 may be laid up so that some of the sidewall base carbon fiber layer 112 is exposed. The first composite material 114 and second composite material 116 may also be laid up so that each layer exposes a portion of the layer below it to form a tapered end. The composite material layup may be performed via automated fiber placement, hand layup assisted with laser projection, ply template hand layup, or any other suitable automated or assisted layup. After laying down a ply or multiple plies, trimming the ply or plies with an ultrasonic knife may reduce AFP tolerance stack-up and effect and reduce the size of the scarf joint by 25% to 50%.

The first tool piece 12 and second tool piece 14 may then be reoriented from the sidewall layup orientation to the consolidation orientation, as shown in block 208. This may require the use of a forklift, lifting hoists, built-in mechanisms, and the like.

The first tool piece 12 and second tool piece 14 may then be attached to each other via connection geometry 22 of the first tool piece 12 and connection geometry 30 of the second tool piece 14, as shown in block 210. The first layup surface 18 and the second layup surface 26 should form a single essentially seamless surface with a space between the first sidewall 102 and the second sidewall 104. Importantly, an aspect ratio of the depth of the first sidewall 102 and/or second sidewall 104 to the width of the space therebetween may be approximately or at least 1, 1.5, 2, or higher, such that it would be difficult to create the first sidewall 102 and second sidewall 104 because there is limited space for the AFP head or for an operator to lay down plies without the tool pieces 12, 14 first being separated.

A third surface film 118 may be deposited on the nose portion of the second layup surface 26, as shown in block 212. A fourth surface film 120 may then be deposited on the third surface film 118, as shown in block 214. Portions of the fourth surface film 120 may overlap portions of the second surface film 110.

A base fiberglass fabric layer 122 may then be laid up on the fourth surface film 120, as shown in block 216. Portions of the base fiberglass fabric layer 122 may overlap portions of the second surface film 110.

A nose filler 124 may then be laid in the middle of the nose layup region 32 of the second layup surface 26, as shown in block 218. The nose filler 124 may be a filler putty or similar malleable material or component.

A nose base carbon fiber layer 126 may then be laid up over the nose filler 124 and the base fiberglass fabric layer 122, as shown in block 220. Portions of the nose base carbon fiber layer 126 may overlap portions of the sidewall base carbon fiber layer 112.

A third composite material 128 may then be laid up in layers on the nose base carbon fiber layer 126 to form the nose wall 106, as shown in block 222. The third composite material 128 may be laid up so that each layer overlaps an exposed layer of first composite material 114 and second composite material 116 of the first sidewall 102 and second sidewall 104, thereby forming slip planes 138A,B between the nose wall 106 and the first sidewall 102 and between the nose wall 106 and the second sidewall 104, thus creating two scarf joints. The composite material layup forming the nose wall 106 may be performed by hand, ply by ply, or by a suitable technique despite limited access to the space as hindered by the first tool 12 and second tool 14. The third composite material 128 may be woven preform or woven plies, for improved impact resistance. On that point, the third composite material 128 may include thicker or additional plies compared to the first and second composite materials 114, 116. Alternatively, the third composite material 128 may be constructed or consolidated offline in a separate process and laid up as a single piece.

Sidewall cap carbon fiber layers 130 may then be laid up over the first composite material 114 and second composite material 116 of the first sidewall 102 and second sidewall 104, as shown in block 224. Portions of the sidewall cap carbon fiber layer 130 may overlap portions of the third composite material 128 of the nose wall 106.

A nose wall cap carbon fiber layer 132 may then be laid up over the third composite material 128 of the nose wall 106, as shown in block 226. Portions of the nose wall cap carbon fiber layer 132 may overlap portions of the sidewall cap carbon fiber layer 130.

Sidewall cap fiberglass fabric layers 134 may then be laid up over the sidewall cap carbon fiber layers 130, as shown in block 228. Portions of the sidewall cap fiberglass fabric layers 134 may extend over the third composite material 128 of the nose wall 106.

A nose wall cap fiberglass fabric layer 136 may then be laid up over the nose wall cap carbon fiber layer 132, as shown in block 230. Portions of the nose wall cap fiberglass layer 132 overlap portions of the sidewall cap fiberglass fabric layers 130.

The nose wall 106 and/or first and second sidewalls 102, 104 may then be debulked, as shown in block 232. This may be performed via a debulking tool. The debulking tool may incorporate a vacuum system and film or elastomeric material applied to surround the U-shaped structure and compress the materials. The vacuum system may be integrated into the two-piece tool 10.

The first sidewall 102, second sidewall 104, and nose wall 106 may then be co-cured, as shown in block 234. To that end, the first composite material 114, second composite material 116, and third composite material 128 may be co-cure compatible.

The first tool piece 12 and second tool piece 14 may then be separated from each other, as shown in block 236. The multi-region U-shaped structure 100 may then be removed from the second tool piece 14 (or first tool piece 12), as shown in block 238.

The above-described method provides several advantages. For example, layup up composite material on separated tool pieces to form sidewalls improves access, thereby allowing for the use of layup aids and automation. Individually fabricating multiple regions also allows for complex structure architecture. In particular, nose sections can be formed with high impact resistance materials and techniques, while sidewalls can be formed with more economical or more suitable sidewall materials and techniques, thus reducing overall weight without sacrificing functionality.

Furthermore, slip planes between regions improve debulking performance, preventing the composite material from wrinkling or bridging in the radius area. Part removal following co-cure is also easier by separating tool pieces. The present invention also allows for smaller nose wall radiuses and tighter part tolerances.

Turning to FIGS. 6-9, a three-piece tool 300 for use in another embodiment is illustrated. The three-piece tool 300 broadly comprises a first tool piece 302, a second tool piece 304, a third tool piece 306, a first auxiliary component 308, and a second auxiliary component 310.

The first tool piece 302 may include a support structure 312 and a first layup surface 314. The first tool piece 302 may be configured to be moved from a sidewall layup orientation to a consolidation orientation. The first tool piece 302 may also be configured to be connected to the third tool piece 306 in the consolidation orientation.

The support structure 312 may include forklift tine geometry, hoist ring geometry, or other features for moving and handling the first tool piece 302. The support structure 312 may include ribs, frame plates, and other components for providing rigidity. The support structure 312 may also include connection geometry 318 such as bolt holes, interlocking tabs, clamps, or the like for connecting the first tool piece 302 to the third tool piece 306.

The first layup surface 314 may be a gradually-sloped smooth surface for laying up materials to form a first sidewall 402. The first layup surface 314 may include a plurality of concave or convex curves. The first layup surface 314 may also curve in multiple dimensions to form a complex shape. The first layup surface 314 may have a depth (in consolidation orientation) smaller or larger than a depth of the second layup surface.

The second tool piece 304 may include a support structure 320 and a second layup surface 322. The second tool piece 304 may be configured to be moved from a sidewall layup orientation to a consolidation orientation. The second tool piece 304 may also be configured to be connected to the third tool piece 306 in the consolidation orientation.

The support structure 320 may include forklift tine geometry 324, hoist ring geometry, or other features for moving and handling the second tool piece 304. The support structure 320 may include ribs, frame plates, and other components for providing rigidity. The support structure 320 may also include connection geometry 326 such as bolt holes, interlocking tabs, clamps, or the like for connecting the second tool piece 304 to the third tool piece 306.

The second layup surface 322 may be a gradually-sloped smooth surface for laying up materials to form a second sidewall 404. The second layup surface 322 may include a plurality of concave or convex curves. The second layup surface 322 may also curve in multiple dimensions to form a complex shape. The second layup surface 322 may have a depth (in consolidation orientation) smaller or larger than a depth of the first layup surface.

The third tool piece 306 may include a support structure 328 and a third layup surface 330. The third tool piece 306 may be configured to be connected to the first tool piece 302 and the second tool piece 304 in the consolidation orientation.

The support structure 328 may include forklift tine geometry, hoist ring geometry, or other features for moving and handling the third tool piece 306. The support structure 328 may include ribs, frame plates, and other components for providing rigidity. The support structure 328 may also include connection geometry 334 such as bolt holes, interlocking tabs, clamps, or the like for connecting the third tool piece 306 to the first tool piece 302 and the second tool piece 304.

The third layup surface 330 may specifically include geometry for laying up materials to form the nose wall 406. The third layup surface 330 may have increased curvature (smaller radii) compared to the first layup surface 314 and the second layup surface 322. The third layup surface 330 may also curve in multiple dimensions to form a complex shape. In one embodiment, the third layup surface 330 forms an edge (seen as a point in elevation view). The third layup surface 330 may form a continuous curve with the first layup surface 314 and the second layup surface 322 when the first tool piece 302 and the second tool piece 304 are positioned adjacent and connected to the third tool piece.

The first auxiliary component 308 may include connection geometry 336 and a first auxiliary layup surface 338. The connection geometry 336 allows the first auxiliary component 308 to be attached to the third tool piece 306.

The first auxiliary layup surface 338 may be a gradually-sloped smooth surface for laying up materials to form a portion of the nose wall 406. The first auxiliary layup surface 338 may include a plurality of concave or convex curves. The first auxiliary layup surface 338 may also curve in multiple dimensions to form a complex shape.

The second auxiliary component 310 may include connection geometry 340 and a second auxiliary layup surface 342. The connection geometry 340 allows the second auxiliary component 310 to be attached to the third tool piece 306 opposite the first auxiliary component 308.

The second auxiliary layup surface 342 may be a gradually-sloped smooth surface for laying up materials to form a portion of the nose wall 406. The second auxiliary layup surface 342 may include a plurality of concave or convex curves. The second auxiliary layup surface 342 may also curve in multiple dimensions to form a complex shape.

Figure 10:
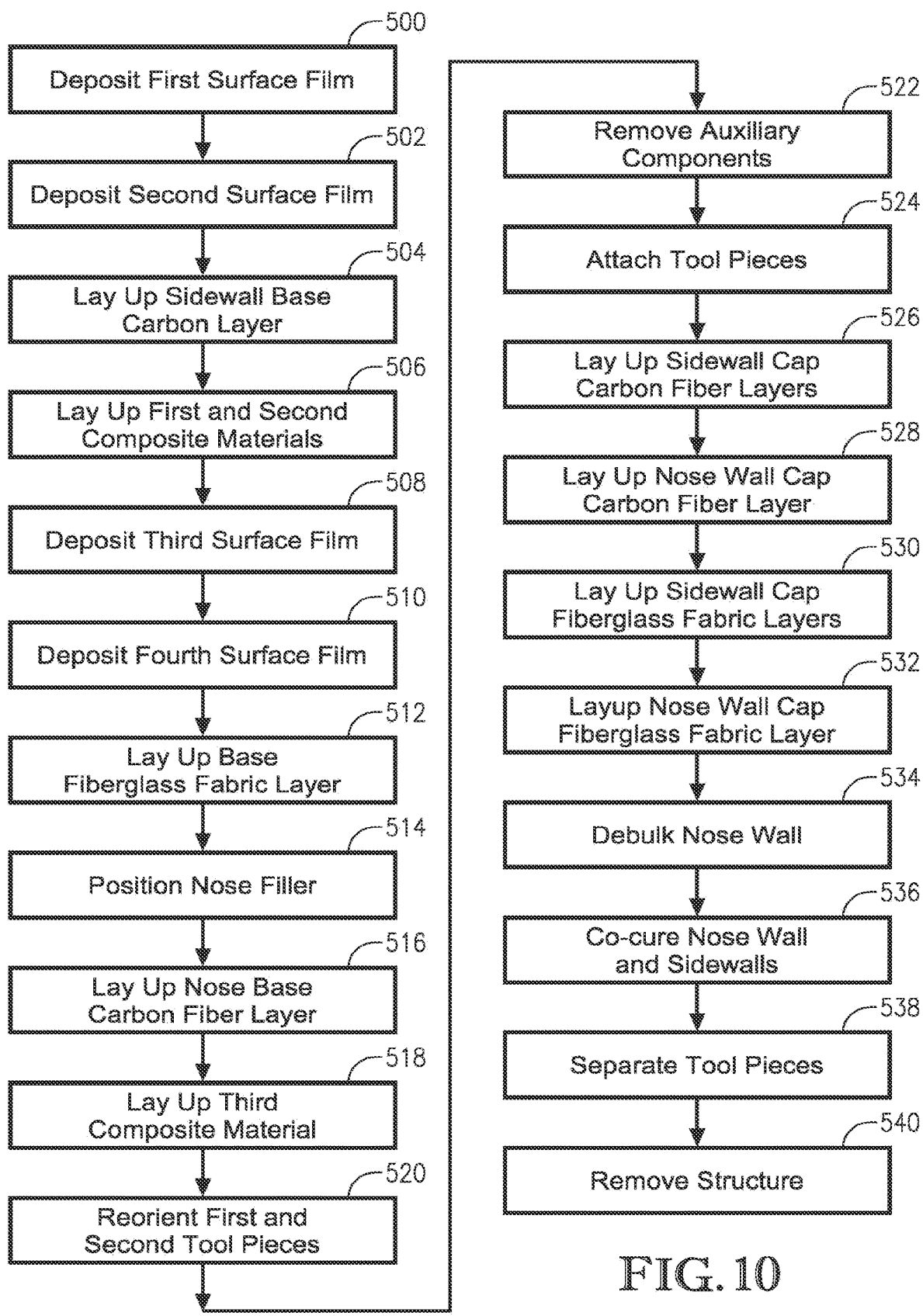
FIG. 10 is a flow diagram depicting certain steps of a method of fabricating a multi-region U-shaped composite structure via the three-piece tool of FIG. 6.

Turning to FIG. 10, and with reference to FIGS. 6-9, a method of fabricating a multi-region U-shaped composite structure 400 via a three-piece tool will now be described in detail. The method will be described with reference to three-piece tool 300, but other three-piece tools may be used.

First, a first surface film 408 (lightning protection, wear protection, or the like) may be deposited on the first layup surface 314 and the second layup surface 322 with the first tool piece 302 and the second tool piece 304 separated and in a sidewall layup orientation, as shown in block 500. A second surface film 410 may then be deposited on the first surface film 408, as shown in block 502. A sidewall base carbon fiber layer 412 (e.g., carbon PW) may then be laid up on the second surface film 410, with some of the second surface film 410 being exposed, as shown in block 504.

First composite material 414 and second composite material 416 may then be laid up in layers on the sidewall base carbon fiber layer 412 to form the first sidewall 402 and the second sidewall 404, as shown in block 506. The first composite material 414 and second composite material 416 may be laid up so that some of the sidewall base carbon fiber layer 412 is exposed. The first composite material 414 and second composite material 416 may also be laid up so that each layer exposes a portion of the layer below it to form a tapered end. The composite material layup may be performed via automated fiber placement, laser projection, ply template layup, or any other suitable automated or assisted layup. An ultrasonic knife may be used to reduce AFP tolerance stack-up and effect between 25% to 50% scarf joint size reduction.

With the first auxiliary component 308 and the second auxiliary component 310 attached to the third tool piece 306, a third surface film 418 may be deposited on the third layup surface 330, the first auxiliary layup surface 338, and the second auxiliary layup surface 342, as shown in block 508. A fourth surface film 420 may then be deposited on the third surface film 418, as shown in block 510. Portions of the fourth surface film 420 may overlap portions of the second surface film 410.

A base fiberglass fabric layer 422 may then be laid up on the fourth surface film 420, as shown in block 512. Portions of the base fiberglass fabric layer 422 may overlap portions of the second surface film 410.

A nose filler 424 may then be laid in the middle of the third layup surface 330, as shown in block 514. The nose filler 424 may be a filler putty or similar malleable material or component.

A nose base carbon fiber layer 426 may then be laid up over the nose filler 424 and the base fiberglass fabric layer 422, as shown in block 516. Portions of the nose base carbon fiber layer 426 may overlap portions of the sidewall base carbon fiber layer 412.

A third composite material 428 may then be laid up in layers on the nose base carbon fiber layer 426 to form the nose wall 406, as shown in block 518. The third composite material 428 may be laid up so that each layer extends past previously laid layers. The composite material layup forming the nose wall 406 may be performed by hand, ply by ply, or by any other suitable technique. The third composite material 428 may be woven preform or woven plies for improved impact resistance. On that point, the third composite material 428 may include thicker or additional plies compared to the first and second composite materials 414, 416.

The first tool piece 302 and second tool piece 304 may then be reoriented from the sidewall layup orientation to the consolidation orientation, as shown in block 520. This may require the use of a forklift, lifting hoists, built-in mechanisms, and the like. The first auxiliary component 308 and the second auxiliary component 310 may also be removed from the third tool piece 306, as shown in block 522. Laid up material may be removed from the third tool piece 306 via vacuum or suction cup overhead mechanical equipment (OHME) before removal of the first and second auxiliary components 308, 310.

The first tool piece 302 and second tool piece 304 may then be attached to the third tool piece 306 via connection geometry 318 of the first tool piece 302, connection geometry 326 of the second tool piece 304, and connection geometry 334 of the third tool piece 306, as shown in block 524. The first layup surface 314, the second layup surface 322, and the third layup surface 330 should form a single essentially seamless surface. Layers of the third composite material 428 should overlap with the layers of the first composite material 414 and the second composite material 416 thereby forming slip planes 438A,B between the nose wall 406 and the first sidewall 402 and between the nose wall 406 and the second sidewall 404, thus creating two scarf joints. Importantly, an aspect ratio of the depth of the first sidewall 402 and/or second sidewall 404 to the width of the space therebetween may be approximately or at least 1, 1.5, 2, or higher, such that it would be difficult to create the first sidewall 402 and second sidewall 404 via the above techniques without the first and second tool pieces 302, 304 first being separated.

Sidewall cap carbon fiber layers 430 may then be laid up over the first composite material 414 and second composite material 416 of the first sidewall 402 and second sidewall 404, as shown in block 526. Portions of the sidewall cap carbon fiber layer 430 may overlap portions of the third composite material 428 of the nose wall 406.

A nose wall cap carbon fiber layer 432 may then be laid up over the third composite material 428 of the nose wall 406, as shown in block 528. Portions of the nose wall cap carbon fiber layer 432 may overlap portions of the sidewall cap carbon fiber layer 430.

Sidewall cap fiberglass fabric layers 434 may then be laid up over the sidewall cap carbon fiber layers 430, as shown in block 530. Portions of the sidewall cap fiberglass fabric layers 434 may extend over the third composite material 428 of the nose wall 406.

A nose wall cap fiberglass fabric layer 436 may then be laid up over the nose wall cap carbon fiber layer 432, as shown in block 532. Portions of the nose wall cap fiberglass layer 436 may overlap portions of the sidewall cap fiberglass fabric layers 434.

The nose wall 406 may then be debulked, as shown in block 534. This may be performed via a debulking tool. The debulking tool may incorporate a vacuum system. The vacuum system may be integrated into the three-piece tool 300.

The first sidewall 402, second sidewall 404, and nose wall 406 may then be co-cured, as shown in block 536. To that end, the first composite material 414, second composite material 416, and third composite material 428 may be co-cure compatible.

The first tool piece 302, second tool piece 304, and third tool piece 306 may then be separated from each other, as shown in step 538. The multi-region U-shaped structure 400 may then be removed from the third tool piece 306, as shown in block 540.

The above-described method provides several advantages. For example, layup up composite material on separated tool pieces to form sidewalls improves access, thereby allowing for the use of layup aids and automation. Individually fabricating multiple regions also allows for complex structure architecture. In particular, nose sections can be formed with high impact resistance materials and techniques, while sidewalls can be formed with more economical or more suitable sidewall materials and techniques, thus reducing overall weight without sacrificing functionality.

Furthermore, slip planes between the regions improve debulking performance. Part removal following co-cure is also easier by separating tool pieces. Utilizing a three-piece tool provides more versatility in terms of material layup order and slip plane location, direction, and size. Nose walls and sidewalls can also be fabricated simultaneously, further reducing manufacturing time. The present invention also allows for smaller nose wall radiuses and tighter part tolerances.

Figure 11:
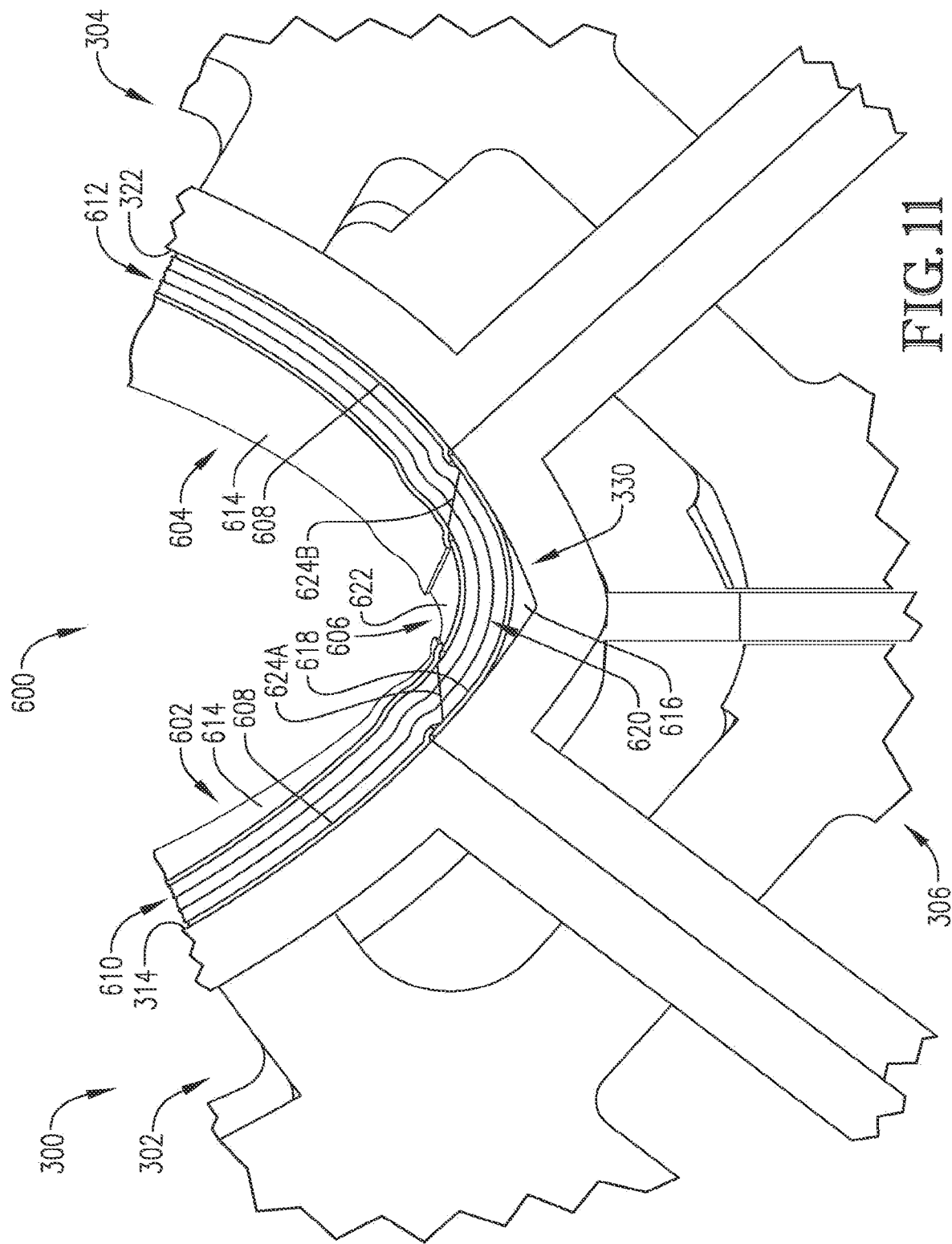
FIG. 11 is a close-up elevation view of the three-piece tool of FIG. 6 utilized in accordance with another embodiment of the invention.
Figure 12:
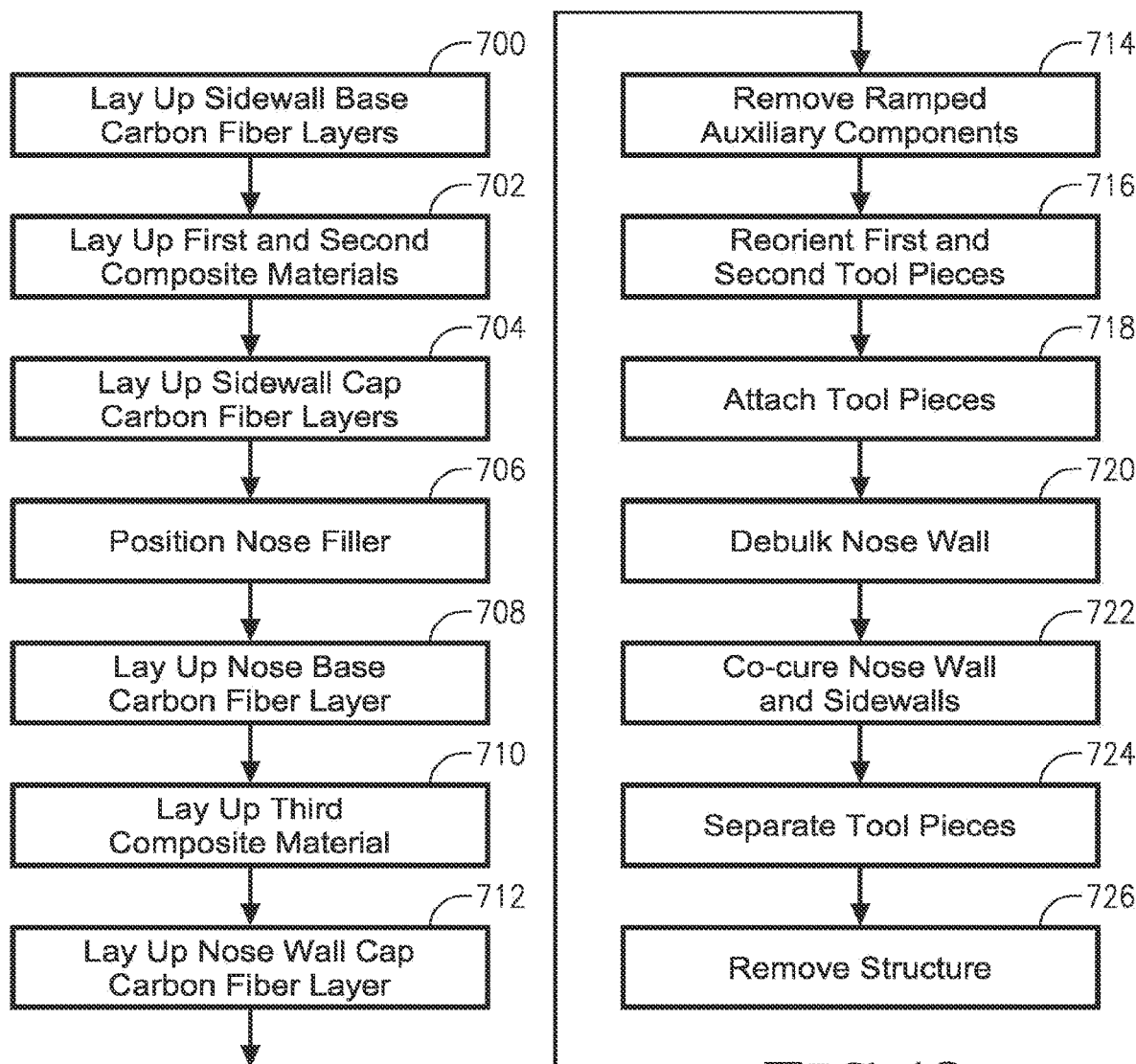
FIG. 12 is a flow diagram depicting certain steps of a method of fabricating a multi-region U-shaped composite structure via the three-piece tool as depicted in FIG. 11.

Turning to FIG. 12, and with reference to FIG. 11, another method of fabricating a multi-region U-shaped composite structure 600 via a three-piece tool will now be described in detail. The method will be described with reference to three-piece tool 300, but other three-piece tools may be used.

First, a sidewall base carbon fiber layer 608 may be laid up on the first layup surface 314 and the second layup surface 322 with the first tool piece 302 and the second tool piece 304 separated and in a sidewall layup orientation, as shown in block 700. This may require the use of ramped auxiliary components temporarily attached to the first tool piece 302 and second tool piece 304 to support at least a portion of the sidewall base carbon fiber layer 608.

First composite material 610 and second composite material 612 may then be laid up in layers on the sidewall base carbon fiber layer 608, as shown in block 702. The first composite material 610 and second composite material 612 may be laid up so that each layer extends past the previous layer to form an upwardly tapered end. Again, this may require the use of ramped auxiliary components temporarily attached to the first tool piece 302 and second tool piece 304. Each ply may be cut after it is laid up. The composite material layup may be performed via automated fiber placement, laser projection, ply template layup, or any other suitable automated or assisted layup. An ultrasonic knife may be used to reduce AFP tolerance stack-up and effect between 25% to 50% scarf joint size reduction.

Sidewall cap carbon fiber layers 614 may then be laid up over the first composite material 610 and second composite material 612 of the first sidewall 602 and second sidewall 604, as shown in block 704. Portions of the sidewall cap carbon fiber layers 614 may extend past the top layers of the first composite material 610 and second composite material 612.

A nose filler 616 may be laid in the middle of the third layup surface 330, as shown in block 706. The nose filler 616 may be a filler putty or similar malleable material or component. A nose base carbon fiber layer 618 may then be laid up over the nose filler 616, as shown in block 708.

A third composite material 620 may then be laid up in layers on the nose base carbon fiber layer 618 to form a nose wall 606, as shown in block 710. The third composite material 620 may be laid up so that each layer exposes a portion of previously laid layers. The composite material layup forming the nose wall 606 may be performed by hand, ply by ply, or by any other suitable technique. The third composite material 620 may be woven preform or woven plies for improved impact resistance.

A nose wall cap carbon fiber layer 622 may then be laid up over the third composite material 620 of the nose wall 606, as shown in block 712. The nose wall cap carbon fiber layer 622 may expose portions of the top layer of the third composite material 620.

The ramped auxiliary components may then be removed from the first tool piece 302 and second tool piece 304 if used during some of the above layup steps, as shown in block 714. The first tool piece 302 and second tool piece 304 may then be reoriented from the sidewall layup orientation to the consolidation orientation, as shown in block 716. This may require the use of a forklift, lifting hoists, built-in mechanisms, and the like.

The first tool piece 302 and second tool piece 304 may then be attached to the third tool piece 306, as shown in block 718. The first layup surface 314, the second layup surface 322, and the third layup surface 330 should form a single essentially seamless surface. Layers of the first composite material 610 and second composite material 612 should overlap with the layers of the third composite material 620 thereby forming slip planes 624A,B between the nose wall 606 and the first sidewall 602 and between the nose wall 606 and the second sidewall 604, thus creating two scarf joints. Importantly, an aspect ratio of the depth of the first sidewall 602 and/or second sidewall 604 to the width of the space therebetween may be approximately or at least 1, 1.5, 2, or higher, such that it would be difficult to create the first sidewall 602 and second sidewall 604 via the above techniques without the first and second tool pieces 302, 304 first being separated.

The nose wall 606 may then be debulked, as shown in block 720. This may be performed via a debulking tool. The debulking tool may incorporate a vacuum system. The vacuum system may be integrated into the three-piece tool 300.

The first sidewall 602, second sidewall 604, and nose wall 606 may then be co-cured, as shown in block 722. To that end, the first composite material 610, second composite material 612, and third composite material 620 may be co-cure compatible.

The first tool piece 302, second tool piece 304, and third tool piece 306 may then be separated from each other, as shown in step 724. The multi-region U-shaped structure 600 may then be removed from the third tool piece 306, as shown in block 726.

The above method illustrates that slip planes between a nose wall and corresponding sidewalls can taper toward the nose wall or away from the nose wall as desired. The slip planes could also taper in the same direction. Other characteristics such as slip plane angle and position (i.e., spacing from an apex of the nose) can also be effected as desired.

Having thus described various embodiments of the invention, what is claimed as new and desired to be protected by Letters Patent includes the following:

1. A method of fabricating a multi-region U-shaped composite structure, the method comprising the steps of:
    forming a space between a first sidewall formed of a first composite material and a second sidewall formed of a second composite material;
    laying up a third composite material in the space to form a nose wall; and
    overlapping at least a portion of the first composite material and at least a portion of the second composite material with separate portions of the third composite material.

2. The method of claim 1, wherein the step of laying up a third composite material to form the nose wall comprises placing an uncured laminate comprising a plurality of plies of the third composite material in the space.

3. The method of claim 1, further comprising a step of tapering layers of the first composite material, the second composite material, and the third composite material, the overlapping step including forming slanted slip planes between the nose wall and the first sidewall and between the nose wall and the second sidewall.

4. The method of claim 1, the step of laying up the third composite material including at least one of automated fiber placement, hand layup assisted with laser projection, and ply template layup.

5. The method of claim 1, the first sidewall and the second sidewall having a depth greater than a width of the space.

6. The method of claim 1, further comprising a step of co-curing the first sidewall, the second sidewall, and the nose wall after the overlapping step.

7. The method of claim 1, the third composite material being a different type of material than the first composite material and second composite material.

8. The method of claim 1, the step of laying up the third composite material being performed ply by ply.

9. The method of claim 1, the first sidewall being positioned on a first tool piece, the second sidewall being positioned on a second tool piece spaced apart from the first tool piece a distance, wherein the distance dictates a size of the space between the first sidewall and the second sidewall.

10. The method of claim 9, wherein the first tool piece and the second tool piece are positioned adjacent to one another during the step of forming the space between the first sidewall and the second sidewall.

11. The method of claim 9, wherein the first tool piece and the second tool piece are positioned on opposite sides of a third tool piece during the step of forming the space between the first sidewall and the second sidewall, and wherein the step of laying up the third composite material includes laying up the third composite material on the third tool piece.

12. The method of claim 9, further comprising a step of separating the first tool piece and the second tool piece to remove the composite structure from the first tool piece and the second tool piece.

13. The method of claim 1, the third composite material including at least one of thicker and additional plies compared to the first and second composite materials.

14. A method of fabricating a multi-region U-shaped composite structure, the method comprising the steps of:
    forming a space between a first sidewall formed of a first composite material and a second sidewall formed of a second composite material;
    positioning a nose wall formed of a third composite material in the space; and
    overlapping separate portions of the third composite material with at least a portion of the first composite material and at least a portion of the second composite material.

15. The method of claim 14, the overlapping step including forming slanted slip planes between the nose wall and the first sidewall and between the nose wall and the second sidewall.

16. The method of claim 14, the first sidewall and the second sidewall having a depth greater than a width of the space.

17. The method of claim 14, further comprising a step of co-curing the first sidewall, the second sidewall, and the nose wall after the overlapping step, the first composite material, second composite material, and third composite material being co-cure compatible.

18. The method of claim 14, the third composite material being different than the first composite material and second composite material.

19. The method of claim 14, the third composite material including at least one of thicker and additional plies compared to the first and second composite materials.

20. A method of fabricating a multi-region U-shaped composite structure, the method comprising the steps of:
  placing a layer of lightning protection on a first tool piece, a second tool piece, and a third tool piece of a three-piece tool;
  laying up a first composite material on the first tool piece via at least one of automated fiber placement, laser projection, and ply template layup to form a first sidewall;
  laying up a second composite material on the second tool piece via at least one of automated fiber placement, laser projection, and ply template layup to form a second sidewall;
  placing a filler on the third tool piece;
  laying up a third composite material on the third tool piece to form a nose wall;
  re-orienting the first tool piece and the second tool piece to a consolidation orientation;
  positioning the third tool piece between the first tool piece and the second tool piece so the nose wall is at least partially positioned in a space between the first sidewall and the second sidewall;
  overlapping at least a portion of the third composite material with at least a portion of the first composite material and at least a portion of the second composite material;
  debulking the nose wall; and
  co-curing the first sidewall, the second sidewall, and the nose wall.

* * * * *